(12) United States Patent
Paik et al.

(10) Patent No.: US 12,130,993 B2
(45) Date of Patent: Oct. 29, 2024

(54) TOUCH DISPLAY DEVICE

(71) Applicant: LG DISPLAY CO., LTD., Seoul (KR)

(72) Inventors: SangYoon Paik, Gyeonggi-do (KR); Chulwoo Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 232 days.

(21) Appl. No.: 17/524,081

(22) Filed: Nov. 11, 2021

(65) Prior Publication Data

US 2022/0155906 A1 May 19, 2022

(30) Foreign Application Priority Data

Nov. 16, 2020 (KR) .................. 10-2020-0152882

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/04166* (2019.05)

(58) Field of Classification Search
None
See application file for complete search history.

(56) References Cited

U.S. PATENT DOCUMENTS

2017/0090633 A1* 3/2017 Kwon ................ G06F 3/04164
2020/0019294 A1* 1/2020 Lee ....................... G06F 3/0448

* cited by examiner

*Primary Examiner* — Krishna P Neupane
(74) *Attorney, Agent, or Firm* — POLSINELLI PC

(57) ABSTRACT

A touch display device drives only some of a plurality of common electrodes disposed in a display panel as a touch electrode, so that an increase of lines and a reduction of an aperture ratio according to implementing a function of a touch sensing can be minimized, and as adjusting a total resistance and a resistance distribution according to locations between the common electrode driven as the touch electrode and the common electrode not driven as the touch electrode same or similarly, an abnormality of a display driving due to partial driving the plurality of common electrodes as the touch electrode and provide the function of the touch sensing can be prevented.

18 Claims, 13 Drawing Sheets

<CE1 circuit connection>

<CE2 circuit connection>

<CE1 resistance distribution>  <CE2 resistance distribution>

TOUCH DISPLAY DEVICE

CROSS-REFERENCE TO RELATED APPLICATION

This application claims priority from Korean Patent Application No. 10-2020-0152882, filed on Nov. 16, 2020, which is hereby incorporated by reference in its entirety.

BACKGROUND

Field of the Disclosure

Aspects of the present disclosure are related to a touch display device.

Description of the Background

The growth of the information society leads to increased demand for display devices to display images and use of various types of display devices, such as liquid crystal display devices, organic light emitting display devices, etc.

The display devices, for providing more various functions to a user, can recognize a touch by a finger or a pen of the user on a display panel, and can perform an input process based on the recognized touch.

The display devices being capable of recognizing the touch, for example, can include a plurality of touch electrodes disposed on the display panel or embedded in the display panel. The display devices can drive the plurality of touch electrodes, detect a change of a capacitance occurring when the user touches on the display panel, and sense the touch of the user.

A plurality of touch lines electrically connected to each of the plurality of touch electrodes can be disposed on the display panel for driving the plurality of touch electrodes. As a size of the display panel increases, the number of the touch electrodes disposed in the display panel can increase, and thus the number of the touch lines connected to the touch electrodes can increase also.

If the number of the touch lines disposed in the display panel increases, an aperture ratio of the display panel can be reduced due to an addition of lines disposed on an active area. Furthermore, the number of pads disposed in the display panel can increase for an electrical connection between the touch lines and a touch driving circuit.

Thus, in the display devices being capable of recognizing the touch, methods being capable of disposing components for a touch sensing in the display panel while preventing a reduction of the aperture ratio of the display panel and an increase of a bezel area are required.

SUMMARY

Accordingly, the present disclosure is to provide methods being capable of maintaining a performance of a touch sensing while reducing the number of electrodes driven as a touch electrode and the number of touch lines.

Also, the present disclosure is to provide methods being capable of preventing an abnormality of a display driving due to an arrangement of electrodes driven as the touch electrode and electrodes not driven as the touch electrode in a display panel.

An aspect of the present disclosure provide a touch display device including a plurality of first electrodes and a plurality of second electrodes disposed to be separated from each other on an active area of a display panel, a plurality of first lines electrically connected between each of the plurality of first electrodes and a touch driving circuit, and a plurality of second lines electrically connected to at least one of the plurality of second electrodes and at least some of the plurality of second lines are electrically connected to each other on a non-active area of the display panel, and wherein a resistance of a line connecting the first line disposed on a first area corresponding to a center portion of the touch driving circuit and the touch driving circuit is greater than a resistance of a line connecting the first line disposed on a second area located on both sides of the first area and the touch driving circuit.

Another aspect of the present disclosure provides a touch display device including a plurality of first electrodes and a plurality of second electrodes disposed to be separated from each other on an active area of a display panel, a plurality of first lines electrically connected between each of the plurality of first electrodes and a touch driving circuit, a first power supply line electrically connected between the touch driving circuit and a touch power circuit, a plurality of second lines electrically connected to at least one of the plurality of second electrodes, and a second power supply line electrically connected between the plurality of second lines and the touch power circuit, and wherein the second power supply line includes a first part disposed on a first side of the touch driving circuit, a second part disposed on a second side of the touch driving circuit, and a line connection portion disposed on a non-active area of the display panel, connecting between the first part and the second part and the plurality of second lines, and crossing at least one of the plurality of first lines at two or more points on the non-active area.

Yet another of the present disclosure provides a touch display device including a plurality of first electrodes and a plurality of second electrodes disposed to be separated from each other on an active area of a display panel, a plurality of first lines electrically connected to each of the plurality of first electrodes and insulated from each other, and a plurality of second lines electrically connected to at least one of the plurality of second electrodes and at least some of the plurality of second lines are electrically connected to each other on a non-active area of the display panel.

According to various aspects of the present disclosure, as disposing a common electrode embedded in a display panel as a separated structure and using some of the separated common electrode as a touch electrode, a function of a touch sensing can be implemented while reducing the number of touch electrodes and the number of touch lines.

According to various aspects of the present disclosure, as disposing a compensation resistance in a circuit driving the common electrode as the touch electrode, or adjusting a resistance of a line connected to the common electrode, thus, among common electrodes, a resistance deviation between electrodes driven as the touch electrode and electrodes not driven as the touch electrode can be reduced, and an abnormality of a display driving due to the resistance deviation between both electrodes can be prevented.

BRIEF DESCRIPTION OF THE DRAWINGS

The above feature, and advantages of the present disclosure will be more clearly understood from the following detailed description, taken in conjunction with the accompanying drawings, in which.

DETAILED DESCRIPTION

Figure 1:
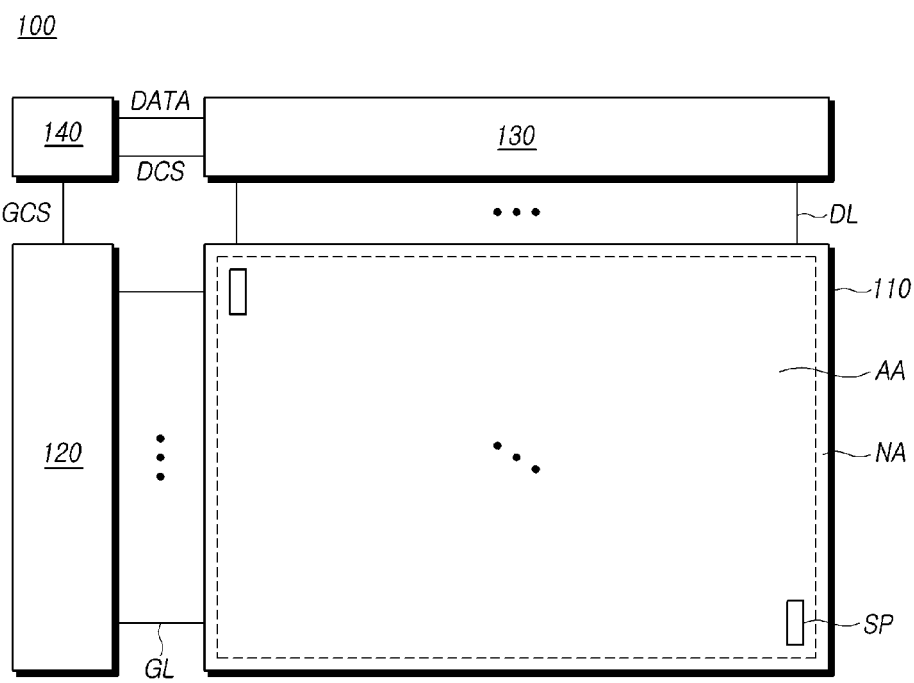
FIG. 1 is a diagram schematically illustrating a configuration for a display driving of a touch display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram schematically illustrating a configuration for a display driving of a touch display device 100 according to aspects of the present disclosure.

Referring to FIG. 1, the touch display device 100 can include a display panel 110 including an active area AA and a non-active area NA, a gate driving circuit 120, a data driving circuit 130 and a controller 140 or the like for driving the display panel 110.

A plurality of gate lines GL and a plurality of data lines DL can be arranged on the display panel 110, and a plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Alternatively, each gate driver integrated circuit GDIC can be implemented by a gate-in-panel GIP method to then be directly arranged on the display panel 110. Alternatively, each gate driver integrated circuit GDIC, in some cases, can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. The data driving circuit 130 outputs the data voltage Vdata to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Alternatively, each source driver integrated circuit can be directly disposed on the display panel 110. Alternatively, each source driver integrated circuit SDIC, in some cases, can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The touch display device 100 can further include a power management integrated circuit for supplying various voltages or currents to the display panel 110, the gate driving circuit 120, the data driving circuit 130, and the like or controlling various voltages or currents to be supplied thereto.

Each of the plurality of subpixels SP can be an area defined by the intersection of the gate line GL and the data line DL, and depending on types of the touch display device 100, a liquid crystal or a light-emitting element can be disposed on the subpixel SP.

For example, in the case that the touch display device 100 is a liquid crystal display device, including a light-source device such as a backlight unit irradiating a light to the display panel 110, a liquid crystal is disposed on the subpixel SP of the display panel 110. And as adjusting an arrangement of the liquid crystal by an electric field made according that the data voltage Vdata is applied to each subpixel SP, can represent a luminance according to the image data and display an image.

For another example, in the case that the touch display device 100 is an organic light-emitting display device, an organic light-emitting diode OLED and a plurality of circuit elements can be disposed on each of the plurality of subpixels SP. And as controlling a current supplied to the organic light-emitting diode OLED disposed on the subpixel SP, each subpixel SP can represent a luminance corresponding to the image data.

Alternatively, the light-emitting element disposed on the subpixel SP can be a light-emitting diode LED or micro light-emitting diode μLED.

For convenience of the description, the touch display device 100 according to aspects of the present disclosure is described a case that the touch display device 100 is the liquid crystal display device as an example, but not limited to this.

Furthermore, the touch display device 100 according to aspects of the present disclosure provides a function sensing a touch of a user on the display panel 110.

The touch display device 100 can perform a touch sensing by using an electrode disposed on the display panel 110, or embedded in the display panel 110. And in the case of performing the touch sensing by using the electrode embedded in the display panel 110, the electrode embedded in the display panel 110 for the display driving can be used as the electrode for the touch sensing.

Figure 2:
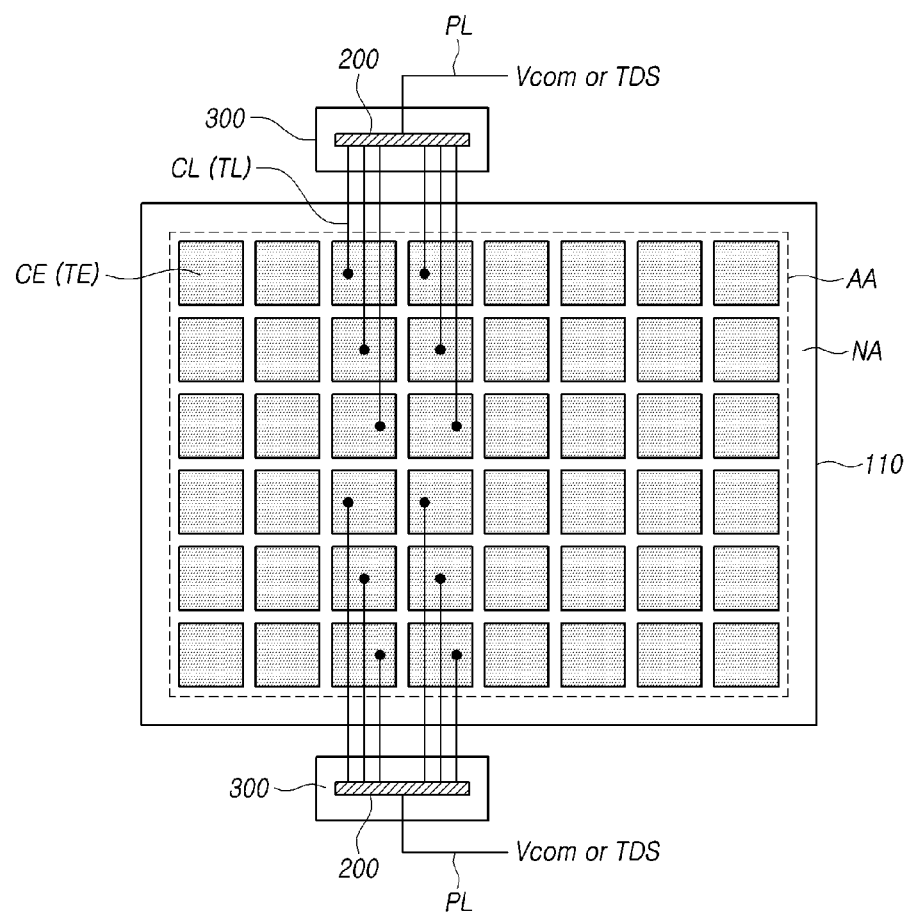
FIG. 2 is a diagram illustrating an example of an arrangement structure of a component for a touch driving of a touch display device according to aspects of the present disclosure.

FIG. 2 is a diagram illustrating an example of an arrangement structure of a component for a touch driving of the touch display device 100 according to aspects of the present disclosure.

Referring to FIG. 2, the touch display device 100 can include the display panel 110 in which a plurality of common electrodes CE are disposed to be separated from each other. The display panel 110 can include a plurality of common electrode lines CL electrically connected to each of the plurality of common electrodes CE.

The touch display device 100 can include a touch driving circuit 200 driving the plurality of common electrodes CE. The touch driving circuit 200, for example, can be disposed on a flexible film 300.

The plurality of common electrodes CE can be supplied with a common voltage Vcom in a display driving period. The common voltage Vcom can be a constant voltage.

The plurality of common electrodes CE can be supplied with a touch driving signal TDS in a touch sensing period. The touch driving signal TDS can be an alternating current voltage.

The plurality of common electrodes CE can perform a function of an electrode for the display driving by being supplied with the common voltage Vcom in the display driving period. And the plurality of common electrode CE can perform a function of a touch electrode TE for the touch sensing by being supplied with the touch driving signal TDS in the touch sensing period.

The touch sensing period, for example, can be a period temporally divided from the display driving period. The touch driving signal TDS can be supplied to the plurality of common electrodes CE in the touch sensing period temporally divided from the display driving period and the touch sensing can be performed.

For another example, the touch sensing period can be same as at least a part period of the display driving period.

In this case, the touch driving signal TDS of a pulse shape can be supplied to the plurality of common electrodes CE in the display driving period. And as the data voltage Vdata modulated based on the touch driving signal TDS is supplied to the data line DL, the touch sensing and the display driving can be perform simultaneously.

Each of the plurality of common electrodes CE can be electrically connected to the touch driving circuit 200 through a common electrode line CL. The common electrode line CL can be considered as a touch line TL.

The touch driving circuit 200 can be disposed on the flexible film 300. The touch driving circuit 200 can be located on at least one side of the display panel 110, one or more touch driving circuit 200 can be disposed depending on the display panel 110. The touch driving circuit 200 can be disposed as a separate circuit. In some cases, the touch driving circuit 200 can be disposed as a circuit integrated with the data driving circuit 130.

The touch driving circuit 200 can be supplied with a power through a power supply line PL. The touch driving circuit 200 can supply the common voltage Vcom to the common electrode CE through the common electrode line CL, or can supply the touch driving signal TDS.

The touch driving circuit 200 can supply the touch driving signal TDS to the common electrode CE, and can receive a touch sensing signal from the common electrode CE that the touch driving signal TDS is applied. The touch driving circuit 200 can generate a touch sensing data based on the touch sensing signal and output the touch sensing data.

The touch display device 100 can include a touch controller (not illustrated) which controls the touch driving circuit 200 and detects a presence or an absence of a touch and a touch coordinate based on the touch sensing data output by the touch driving circuit 200.

According to aspects of the present disclosure, as performing the touch sensing by using the common electrode CE disposed in the display panel 110, the function of the touch sensing can be provided without disposing a separate electrode in the display panel 110.

As the touch display device 100 performs the touch sensing and the display driving as temporally dividing, or supplies the data voltage Vdata modulated by performing the display driving and the touch sensing simultaneously, the touch display device 100 can perform the touch sensing without affecting the display driving.

Furthermore, by using only some common electrodes CE among the plurality of common electrodes CE disposed in the display panel 110 as the touch electrode TE, the function of the touch sensing can be provided while minimizing an increase of a line and a pad for the touch sensing.

Figure 3A:
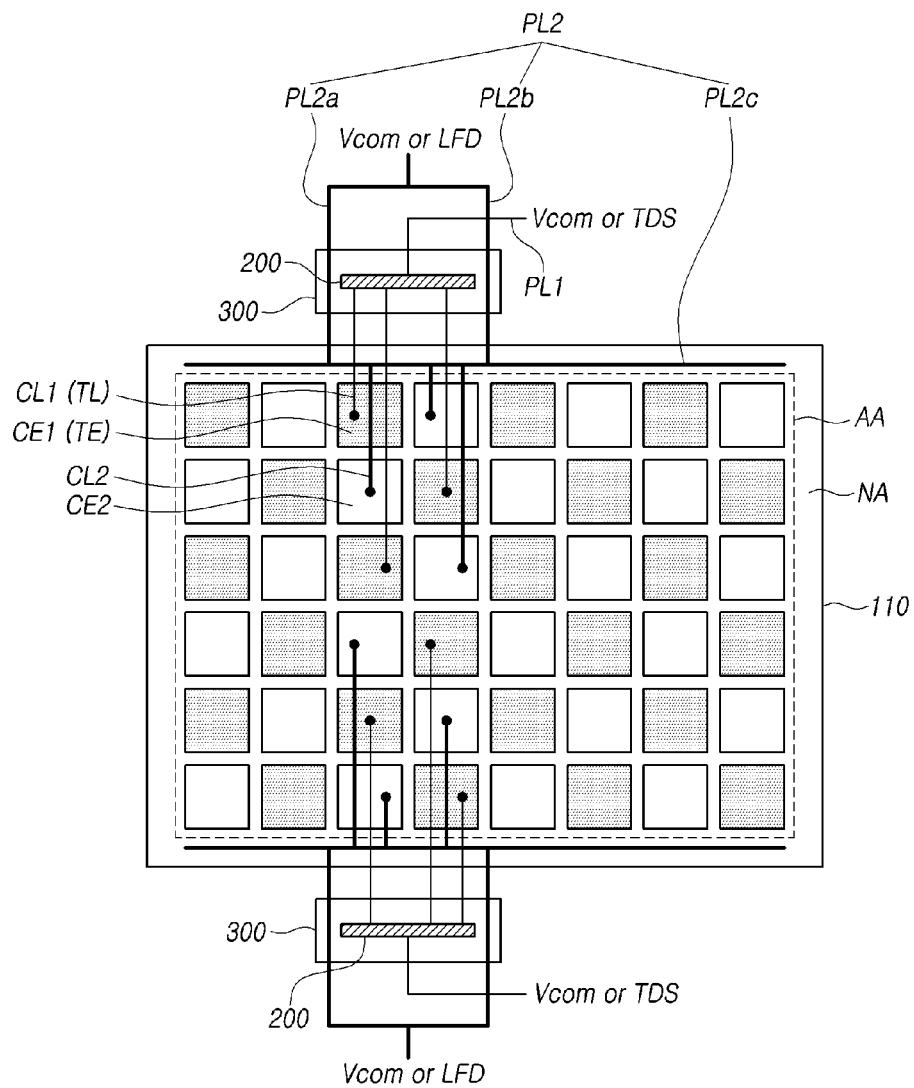
FIGS. 3A and 3B are diagrams illustrating other example of an arrangement structure of a component for a touch driving of a touch display device according to aspects of the present disclosure.
Figure 3B:
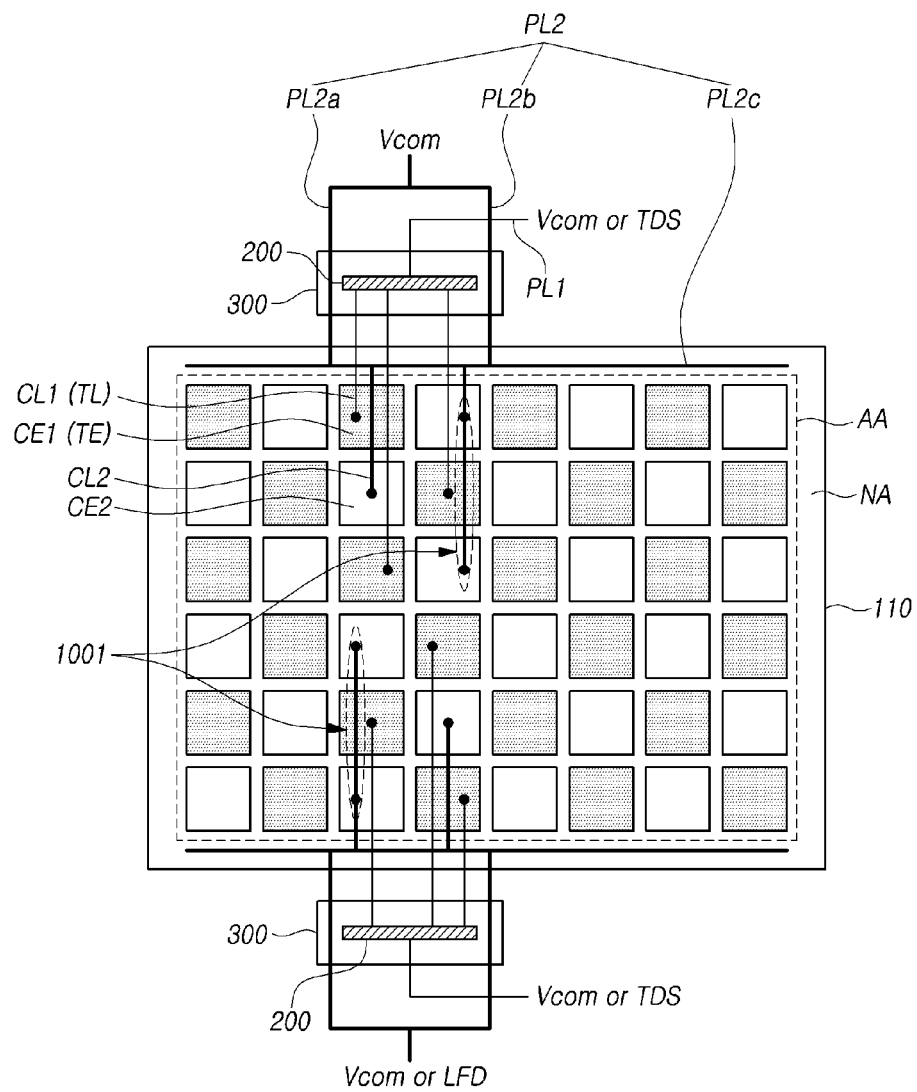

FIGS. 3A and 3B are diagrams illustrating other example of an arrangement structure of a component for a touch driving of the touch display device 100 according to aspects of the present disclosure.

Referring to FIG. 3A, the display panel 110 can include a plurality of first common electrodes CE1 and a plurality of second common electrodes CE2 disposed on the active area AA. The plurality of first common electrodes CE1 and the plurality of second common electrodes CE2 can be electrodes that the common electrode CE for the display driving is separated to be disposed. In the present disclosure, the first common electrode CE1 can be referred as "a first electrode". In the present disclosure, the second common electrode CE2 can be referred as "a second electrode".

The plurality of first common electrodes CE1 and the plurality of second common electrodes CE2, for example, can be disposed alternatively along a horizontal direction. The plurality of first common electrodes CE1 and the plurality of second common electrodes CE2, for another example, can be disposed alternatively along a vertical direction.

Furthermore, such as an example illustrated in FIG. 3A, the plurality of first common electrodes CE1 and the plurality of second common electrodes CE2 can be disposed alternatively along the horizontal direction and the vertical direction.

Each of the plurality of first common electrodes CE1 can be electrically connected to a first common electrode line CL1. Each of the plurality of second common electrodes CE2 can be electrically connected to a second common electrode line CL2. In the present disclosure, the first common electrode line CL1 can be referred as "a first line". In the present disclosure, the second common electrode line CL2 can be referred as "a second line".

The plurality of first common electrode CE1 can be electrically connected to the touch driving circuit 200 through the first common electrode line CL1. The touch driving circuit 200 can be supplied with a power through a first power supply line PL1.

The plurality of first common electrodes CE1 can be supplied with the common voltage Vcom or the touch driving signal TDS from the touch driving circuit 200.

Thus, the plurality of first common electrodes CE1 can provide a function of the electrode for the display driving in the display driving period, and can provide a function of the touch electrode TE in the touch sensing period. And the first common electrode line CL1 can be considered as the touch line TL.

The plurality of second common electrodes CE2 can be supplied with a voltage or a signal through the second common electrode line CL2.

The second common electrode line CL2, for example, can be electrically connected to a second power supply line PL2 on the non-active area NA of the display panel 110.

The second power supply line PL2, for example, can include a first part PL2a disposed on one side of the touch driving circuit 200, a second part PL2b disposed on other side of the touch driving circuit 200, and a common electrode line connection portion PL2c disposed in a direction crossing the second common electrode line CL2 on the non-active area NA. In the present disclosure, the common electrode line connection portion PL2c can be referred as "a line connection portion".

The first part PL2a and the second part PL2b of the second power supply line PL2, for example, can be disposed on the flexible film 300 on which the touch driving circuit 200 is mounted. The touch driving circuit 200 can be located between a point that the first part PL2a and the second part PL2b are diverged and the active area AA of the display panel 110. That is, the first part PL2a and the second part PL2b can be diverged at a front end of the touch driving circuit 200.

The common electrode line connection portion PL2c of the second power supply line PL2, for example, can be disposed on the non-active area NA, and can be connected to two or more second common electrode lines CL2.

The common electrode line connection portion PL2c can be a portion of the second power supply line PL2, but in some cases, can be a line disposed separately from the second power supply line PL2.

As the common electrode line connection portion PL2c is disposed in a direction crossing the first common electrode line CL1, at least a portion of the common electrode line connection portion PL2c can be disposed on a layer different from a layer where the first common electrode line CL1 is disposed.

By the common electrode line connection portion PL2c, two or more second common electrode lines CL2 disposed on the display panel 110 can be electrically connected to each other.

The second common electrode line CL2 can be disposed on a layer where the common electrode line connection portion PL2c is disposed, or can be disposed on a layer different from a layer where the common electrode line connection portion PL2c is disposed. Thus, in some cases, at least a portion of the second common electrode line CL2 can be disposed on a layer different from a layer where the first common electrode line CL1 is disposed.

The plurality of second common electrode lines CL2 electrically connected to each of the plurality of second common electrodes CE2 can be electrically connected on the non-active area NA of the display panel 110. And at least two of the plurality of second common electrodes CE2 can be physically separated, and can be electrically connected.

The plurality of second common electrodes CE2 can be supplied with the common voltage Vcom which is supplied by the second power supply line PL2 in the display driving period through the second common electrode line CL2. Thus, the plurality of second common electrodes CE2 can perform a function of the electrode for the display driving in the display driving period.

The plurality of second common electrode CE2 can be supplied with a load free driving signal LFD which is supplied by the second power supply line PL2 in the touch sensing period.

The load free driving signal LFD can be a signal corresponding to the touch driving signal TDS. The signal corresponding to the touch driving signal TDS can mean a signal which is same as at least one of a frequency, a phase and a amplitude of the touch driving signal TDS. Alternatively, in some cases, a specific signal may not be supplied to the plurality of second common electrodes CE2 in the touch sensing period.

As the touch driving signal TDS is supplied to the plurality of first common electrodes CE1 in the touch sensing period, the touch sensing can be performed.

And as the load free driving signal LFD is supplied to the plurality of second common electrodes CE2 in the touch sensing period, a parasitic capacitance between the second common electrode CE2 and the first common electrode CE1 can be reduced.

Thus, in a period that the touch sensing is performed by driving the first common electrode CE1, it can be possible to prevent that an accuracy of the touch sensing is dropped due to the parasitic capacitance between the first common electrode CE1 and the second common electrode CE2.

As the plurality of first common electrodes CE1 are disposed on a peripheral area of the second common electrode CE2, when the touch occurs, the presence or the absence of the touch and the touch coordinate can be detected based on the touch sensing signal detected through the plurality of first common electrodes CE1 disposed on the peripheral area of the second common electrode CE2.

Such as described above, according to aspects of the present disclosure, when separating the common electrode CE disposed in the display panel 110 and driving as the touch electrode TE, by using only some of the common electrode CE as the touch electrode TE, the function of the touch sensing can be implemented while minimizing an increase of a line, a pad and a channel for the touch sensing.

Furthermore, by reducing the second common electrode line CL2 connected to the second common electrode CE2 which is not driven as the touch electrode TE, the number of lines disposed on the active area AA of the display panel 110 can be reduced further.

Referring to FIG. 3B, the plurality of first common electrode CE1 and the plurality of second common electrode CE2 can be disposed on the active area AA of the display panel 110.

Each of the plurality of first common electrodes CE1 can be physically separated from each other and can be electrically separated. Each of the plurality of first common electrodes CE1 can be electrically connected to the first common electrode line CL1. Each of the plurality of first common electrodes CE1 can perform a function of the electrode for the display driving, or a function of the touch electrode TE, depending on a voltage or a signal supplied through the first common electrode line CL1.

Each of the plurality of second common electrodes CE2 can be physically separated from each other. And at least some of the plurality of second common electrodes CE2 can be electrically connected through the second common electrode line CL2.

Each of the plurality of second common electrodes CE2 can be electrically connected to the second common electrode line CL2. And as the second common electrode line CL2 is electrically connected on the non-active area NA of the display panel 110, the plurality of second common electrodes CE2 can be electrically connected.

Furthermore, two or more second common electrodes CE2 disposed on a same line (a row or a column) can be electrically connected to a same second common electrode line CL2.

For example, such as an area indicated by 1001 illustrated in FIG. 3B, the second common electrode CE2 disposed on the same column can be electrically connected to the same second common electrode line CL2.

The first common electrode line CL1 connected to the first common electrode CE1 which is required to be driven separately can be electrically connected to each of the first common electrode CE1.

And, as at least some of the second common electrode lines CL2 connected to the second common electrode CE2 which is not driven as the touch electrode TE and is driven simultaneously are connected two or more second common electrodes CE2, the number of common electrode lines CL disposed on the active area AA can be reduced.

Such as described above, as driving only some of the common electrode CE disposed in the display panel 110 as the touch electrode TE, the function of the touch sensing can be implemented while minimizing an increase of a line or the like for the touch sensing.

On the other hand, as a line connection structure of the first common electrode CE1 driven as the touch electrode TE and a line connection structure of the second common electrode CE2 not driven as the touch electrode TE are different from each other, a difference can be present between a load of a path that a voltage or a signal is supplied to the first common electrode CE1 and a load of a path that a voltage or a signal is supplied to the second common electrode CE2.

Figure 4:
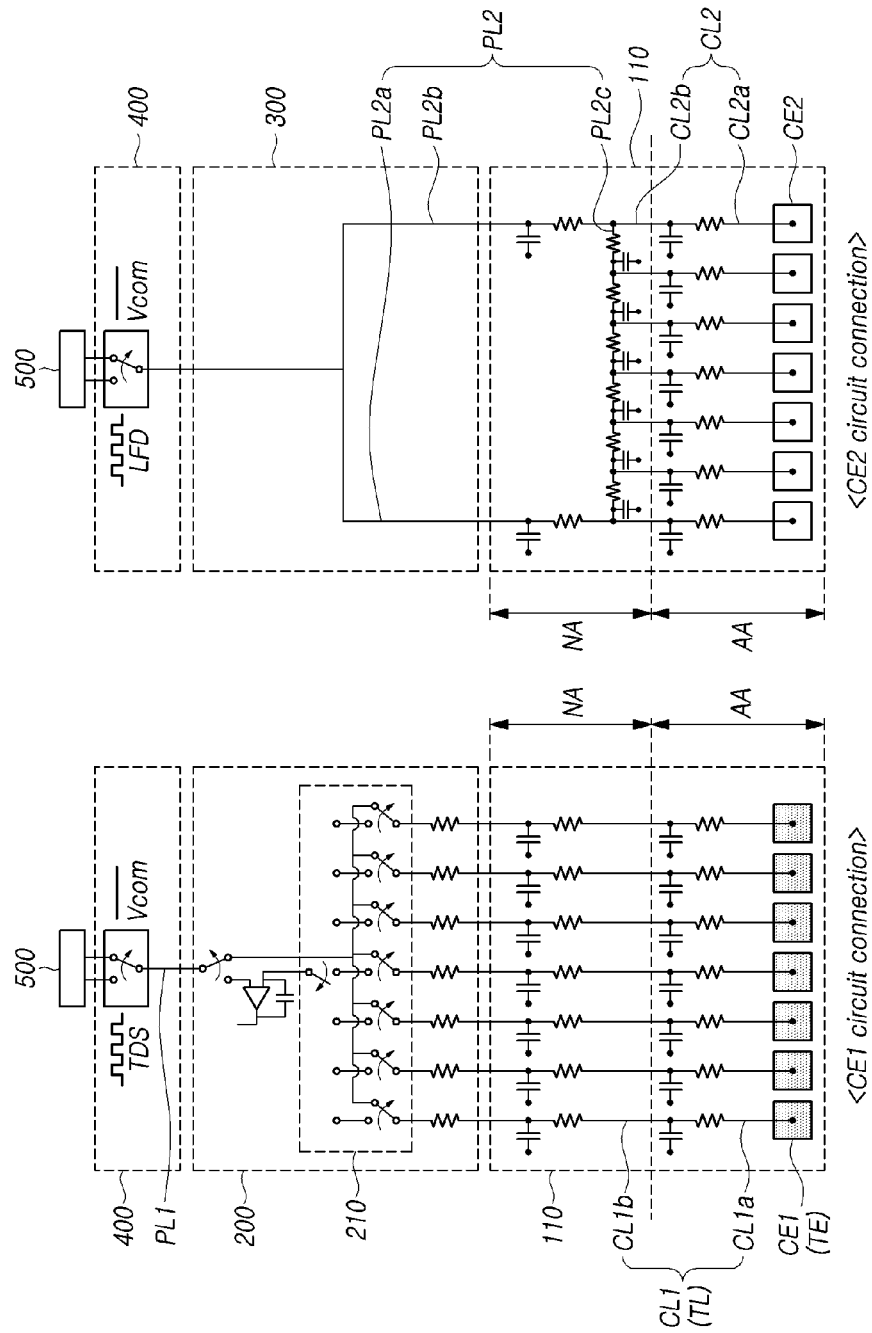
FIG. 4 is a diagram illustrating an example of a circuit connection structure of a first common electrode driven as a touch electrode and a circuit connection structure of a second common electrode not driven as the touch electrode among common electrodes included in a touch display device according to aspects of the present disclosure.

FIG. 4 is a diagram illustrating an example of a circuit connection structure of the first common electrode CE1 driven as the touch electrode TE and a circuit connection structure of the second common electrode CE2 not driven as the touch electrode TE among common electrodes CE included in the touch display device 100 according to aspects of the present disclosure. Such as FIGS. 3A and 3B, the first common electrode CE1 and the second common electrode CE2 are disposed alternatively. FIG. 4 and the following drawings (FIGS. 5, 8A and 9A) are diagrams illustrating each of the circuit connection structure of the first common electrode CE1 and the circuit connection structure of the second common electrode CE2 separately, for easily describing a resistance distribution of a line connected to the first common electrode CE1 and a resistance distribution of a line connected to the second common electrode CE2.

Referring to an example of the circuit connection structure of the first common electrode CE1 in FIG. 4, the first common electrode CE1 can be electrically connected to the touch driving circuit 200 by the first common electrode line CL1.

The touch driving circuit 200 can include a multiplexer 210 for driving the first common electrode CE1 sequentially. Thus, the first common electrode line CL1 can be electrically connected to the multiplexer 210.

For example, the first common electrode line CL1 can include a first common electrode driving line CL1a disposed on the active area AA to be electrically connected to the first common electrode CE1 and a first common electrode link line CL1b disposed on the non-active area NA to be electrically connected to the touch driving circuit 200.

The first common electrode link line CL1b can be electrically connected to the multiplexer 210 disposed in the touch driving circuit 200. Here, the first common electrode link line CL1b and the multiplexer 210 can be connected by a line disposed in the touch driving circuit 200 and having a constant resistance.

The touch driving circuit 200 can be electrically connected to a touch power circuit 400 by the first power supply line PL1.

The touch power circuit 400 can be supplied with a power from a power supply circuit 500. The touch power circuit 400, for example, can output the touch driving signal TDS of the pulse shape to the touch driving circuit 200 by using a voltage supplied from the power supply circuit 500 and a pulse width modulation signal.

The touch power circuit 400 can output the common voltage Vcom to the touch driving circuit 200 by using a voltage supplied from the power supply circuit 500.

Referring to an example of the circuit connection structure of the second common electrode CE2 in FIG. 4, the second common electrode CE2 can be electrically connected to the second power supply line PL2 by the second common electrode line CL2.

For example, the second common electrode line CL2 can include a second common electrode driving line CL2a disposed on the active area AA to be electrically connected to the second common electrode CE2 and a second common electrode link line CL2b disposed on the non-active area NA to be electrically connected to the second power supply line PL2.

The second power supply line PL2 can include the first part PL2a and the second part PL2b disposed on the flexible film 300. The second power supply line PL2 can include the common electrode line connection portion PL2c disposed on the non-active area NA and electrically connected to the plurality of second common electrode lines CL2.

The second power supply line PL2 can be disposed to bypass the touch driving circuit 200 on the flexible film 300. In some cases, a portion of the second power supply line PL2 can be disposed inside of the touch driving circuit 200 disposed on the flexible film 300.

The second power supply line PL2 can be electrically connected to the touch power circuit 400.

The second power supply line PL2 can supply the load free driving signal LFD or the common voltage Vcom supplied by the touch power circuit 400 to the second common electrode CE2 through the second common electrode line CL2.

In some cases, in the case that only common voltage Vcom is supplied to the second common electrode CE2, the second power supply line PL2 can be directly connected to the power supply circuit 500.

By differentiating paths that a voltage or a signal is supplied to the first common electrode line CL1 and the second common electrode line CL2, the function of the touch sensing can be implemented by using some of the common electrode CE disposed in the display panel 110.

Here, as the circuit connection structure of the first common electrode CE1 and the circuit connection structure of the second common electrode CE2 are different, a load of a path that a signal is supplied to the first common electrode CE1 and a load of a path that a signal is supplied to the second common electrode CE2 can be different.

For example, while the first common electrode lines CL1 electrically connected to the first common electrodes CE1 are disposed to be separated from each other, as the second common electrode lines CL2 electrically connected to the second common electrodes CE2 can be electrically connected to each other, a load of the circuit connection structure of the second common electrode CE2 can be great.

Aspects of the present disclosure provide methods being capable of reducing a difference between a load of the circuit connection structure of the first common electrode CE1 and a load of the circuit connection structure of the second common electrode CE2 and preventing an abnormality of the display driving due to a deviation of a load between the first common electrode CE1 and the second common electrode CE2.

Figure 5:
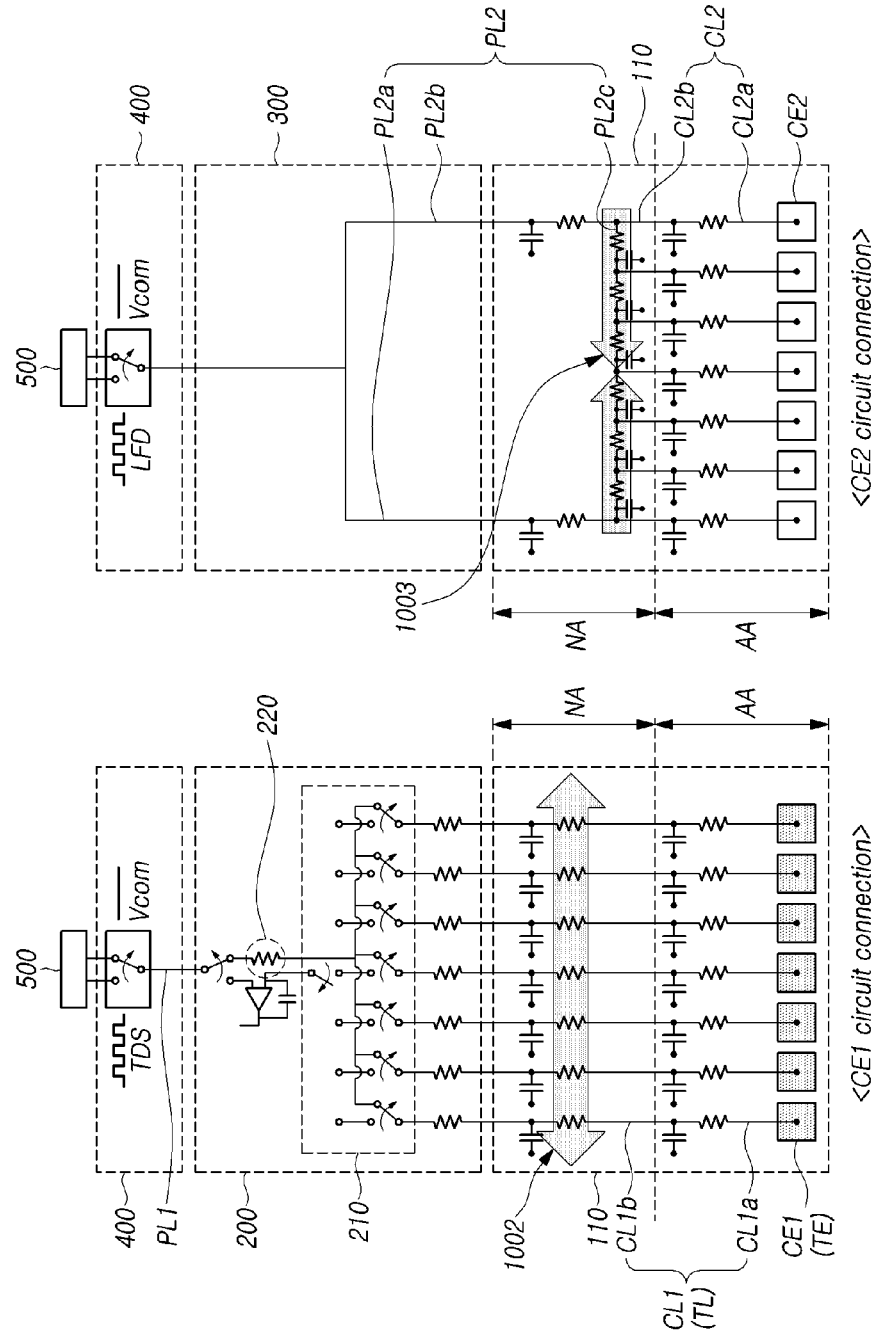
FIG. 5 is a diagram illustrating other example of a circuit connection structure of a first common electrode and a circuit connection structure of a second common electrode included in a touch display device according to aspects of the present disclosure.
Figure 6:
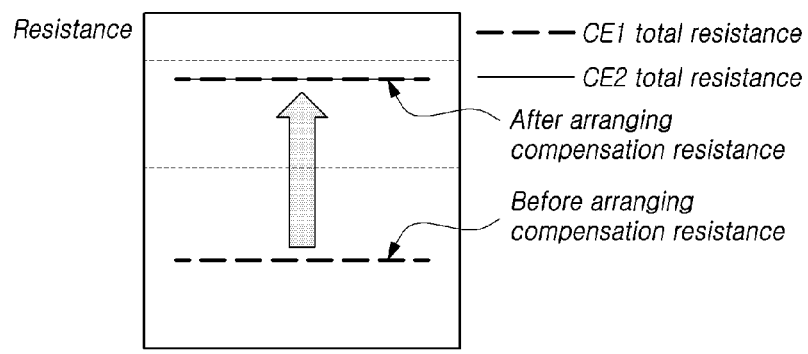
FIGS. 6 and 7 are diagrams illustrating a resistance distribution according to the circuit connection structure illustrated in FIG. 5.
Figure 7:
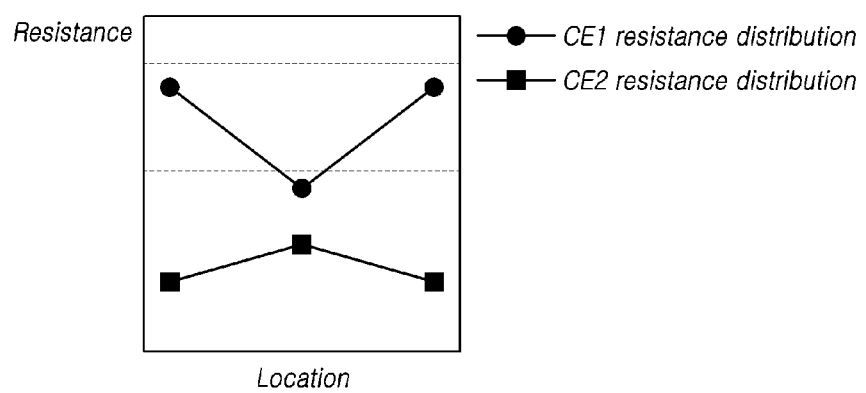

FIG. 5 is a diagram illustrating other example of the circuit connection structure of the first common electrode CE1 and the circuit connection structure of the second common electrode CE2 included in the touch display device 100 according to aspects of the present disclosure. FIGS. 6 and 7 are diagrams illustrating a resistance distribution according to the circuit connection structure illustrated in FIG. 5.

Referring to the circuit connection structure of the first common electrode CE1 in FIG. 5, the first common electrode CE1 can be electrically connected to the first common electrode line CL1. The first common electrode line CL1 can be electrically connected to the multiplexer 210 disposed in the touch driving circuit 200.

The multiplexer 210 can be electrically connected to the touch power circuit 400 through the first power supply line PL1.

The touch driving circuit 200 can include a compensation resistance 220 which is electrically connected between the multiplexer 210 and the first power supply line PL1.

The compensation resistance 220 is a resistance for increasing a resistance of a path between the multiplexer 210 and the touch power circuit 400, a type of the compensation resistance 220 is not limited specifically. And the compensation resistance 220 can be located inside the touch driving circuit 200, but in some cases, can be located outside the touch driving circuit 200.

The compensation resistance 220 can be located on a path that the common voltage Vcom is supplied inside the touch driving circuit 200.

As the compensation resistance 220 is located on the path that the common voltage Vcom is supplied, a resistance of a path that the common voltage Vcom is supplied to the first common electrode CE1 in the display driving period can increase.

Referring to the circuit connection structure of the second common electrode CE2 in FIG. 5, a component such as the compensation resistance 220 above-mentioned may not be disposed on a path that a voltage or a signal is supplied to the second common electrode CE2.

Thus, a resistance of the circuit connection structure of the second common electrode CE2 can be maintained as it is, and a resistance of the circuit connection structure of the first common electrode CE1 can increase only.

Referring to FIG. 6, a total resistance of the circuit connection structure of the first common electrode CE1 before disposing the compensation resistance 220 in the touch driving circuit 200 can be smaller than a total resistance of the circuit connection structure of the second common electrode CE2.

As disposing the compensation resistance 220 in the touch driving circuit 200, the total resistance of the circuit connection structure of the first common electrode CE1 can increase.

Due to arrangement of the compensation resistance 220, the total resistance of the circuit connection structure of the first common electrode CE1 and the total resistance of the circuit connection structure of the second common electrode CE2 can become same or similar.

Thus, in the case that same common voltage Vcom is supplied to the first common electrode CE1 and the second common electrode CE2 in the display driving period, a deviation between a load of the circuit connection structure of the first common electrode CE1 and a load of the circuit connection structure of the second common electrode CE2 can be reduced, and an abnormality of the display driving can be prevented.

Aspects of the present disclosure can reduce a total load deviation between the first common electrode CE1 and the second common electrode CE2 by the compensation resistance 220. Furthermore, as adjusting a resistance of the common electrode line CL or the power supply line PL, a deviation of a resistance distribution according to locations of the common electrode line CL can be reduced.

Referring to FIGS. 5 and 7, a length of the first common electrode link line CL1b of the first common electrode line CL1 can increase as it is more adjacent to a side portion of the touch driving circuit 200.

Thus, such as an area indicated by 1002 in FIG. 5, a resistance of the first common electrode line CL1 located adjacent to the side portion of the touch driving circuit 200 can be greater than a resistance of the first common electrode line CL1 located adjacent to a center portion of the touch driving circuit 200. An area corresponding to the center portion of the touch driving circuit 200 can be referred as "a first area". Areas located on both sides of the first area can be referred as "a second area". In an example above-mentioned, a resistance of the first common electrode line CL1 disposed on the second area can be greater than a resistance of the first common electrode line CL1 disposed on the first area.

While, as the second common electrode line CL2 is connected to the common electrode line connection portion PL2c disposed on the non-active area NA of the display panel 110, a resistance of the second common electrode line CL2 can increase from the side portion toward the center portion.

Therefore, such as a graph illustrated in FIG. 7, the resistance distribution according to locations of the first common electrode CE1 can represent a tendency reducing toward the center portion, and the resistance distribution according to locations of the second common electrode CE2 can represent a tendency increasing toward the center portion.

Aspects of the present disclosure can adjust the total resistance similarly by the compensation resistance 220 primarily. And by adjusting at least one of the resistance distribution according to locations of the first common electrode CE1 and the resistance distribution according to locations of the second common electrode CE2, a deviation of a resistance according to a difference of the circuit connection structures of the first common electrode CE1 and the second common electrode CE2 can be reduced further.

Figure 8A:
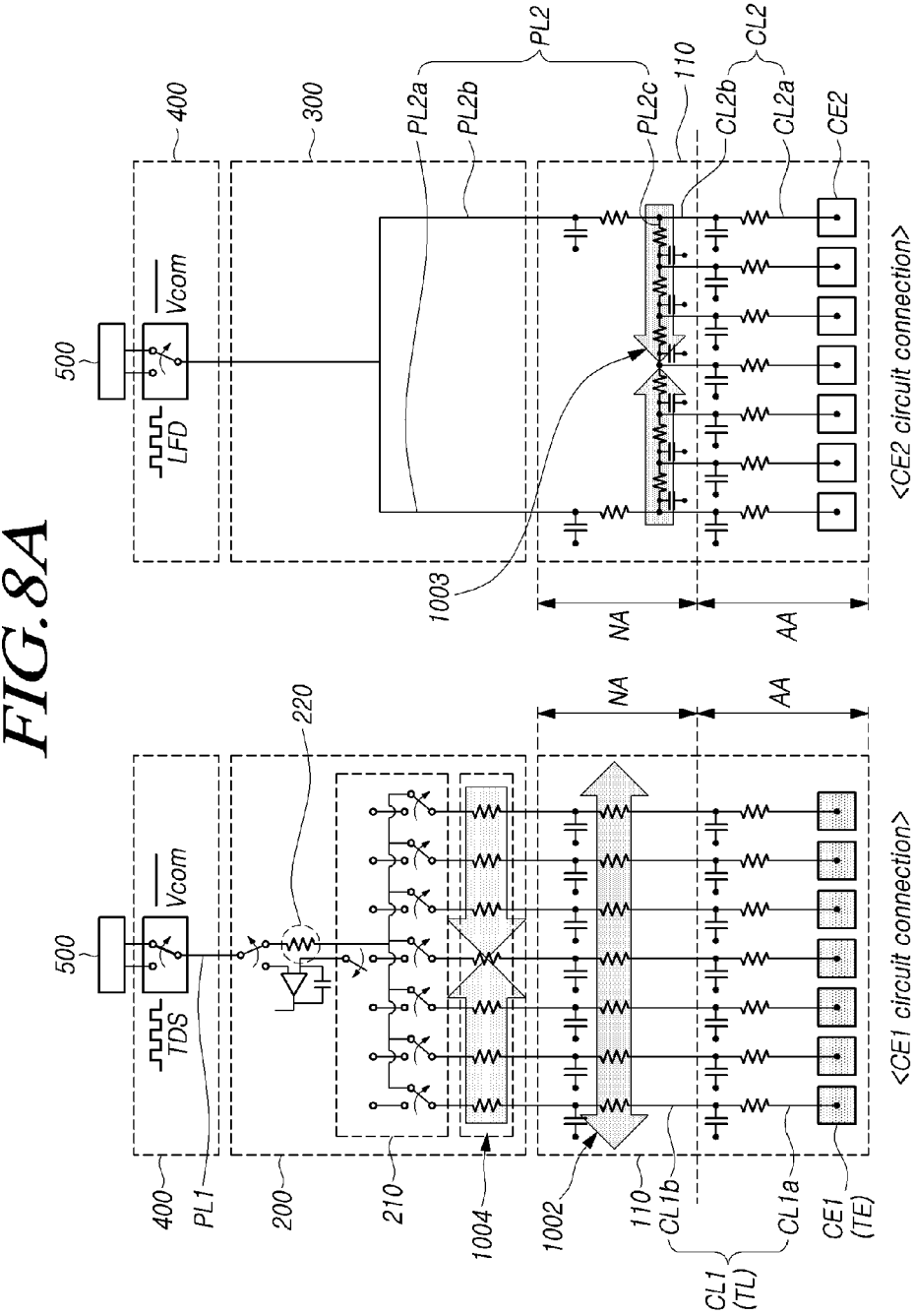
FIGS. 8A and 8B are diagrams illustrating other example of a circuit connection structure of a first common electrode and a circuit connection structure of a second common electrode included in a touch display device according to aspects of the present disclosure and a resistance distribution according to the example.
Figure 8B:
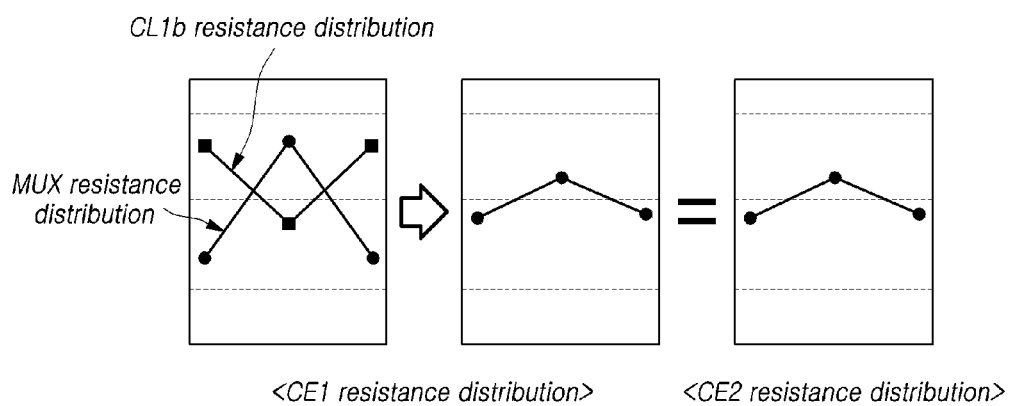

FIGS. 8A and 8B are diagrams illustrating other example of the circuit connection structure of the first common electrode CE1 and the circuit connection structure of the second common electrode CE2 included in the touch display device 100 according to aspects of the present disclosure and the resistance distribution according to the example.

Referring to FIG. 8A, in the circuit connection structure of the first common electrode CE1, the compensation resistance 220 electrically connected between the multiplexer 210 in the touch driving circuit 200 and the first power supply line PL1 can be disposed.

The total resistance of the circuit connection structure of the first common electrode CE1 can increase due to the arrangement of the compensation resistance 220.

A resistance of a line disposed in the touch driving circuit 200 and electrically connecting between the first common electrode line CL1 and the multiplexer 210 may not be constant.

For example, such as an area indicated by 1004 in FIG. 8A, a resistance of a line connecting between the first common electrode line CL1 adjacent to the center portion of the touch driving circuit 200 and the multiplexer 210 can be greater than a resistance of a line connecting between the first common electrode line CL1 adjacent to the side portion of the touch driving circuit 200 and the multiplexer 210.

A resistance of a line connected to an output end of the multiplexer 210 in the touch driving circuit 200 can increase toward the center portion of the multiplexer 210.

As a resistance of a line connected to the output end of the multiplexer 210 increases toward the center portion of the touch driving circuit 200, it can be mutually complemented with that a resistance of the first common electrode link line CL1b increases toward the side portion of the touch driving circuit 200.

Such as an example illustrated in FIG. 8B, a resistance of the multiplexer 210 disposed in the touch driving circuit 200 can represent a tendency increasing toward the center portion, and a resistance of the first common electrode link line CL1b disposed on the non-active area NA of the display panel 110 can represent a tendency reducing toward the center portion.

And the resistance distribution of the multiplexer 210 and the resistance distribution of the first common electrode link line CL1b are combined to be capable of representing a distribution that a resistance increases slightly toward the center portion of the touch driving circuit 200.

Thus, the resistance distribution of the circuit connection structure of the first common electrode CE1 can represent a distribution similar with the resistance distribution of the circuit connection structure of the second common electrode CE2.

By adjusting the total resistance similarly by the compensation resistance 220 and adjusting a resistance of a portion of the output end of the multiplexer 210 in the touch driving circuit 200, the resistance distribution according to locations of the common electrode line CL can be adjusted similarly.

Through these, the resistance deviation between the first common electrode CE1 having a connection structure driven as the touch electrode TE and the second common electrode CE2 not driven as the touch electrode TE can be reduced further. And an abnormality of the display driving of the touch display device 100 that some of the common electrode CE is driven as the touch electrode TE can be prevented.

Alternatively, by methods to adjust the resistance distribution of the circuit connection structure of the second common electrode CE2, the resistance deviation between the circuit connection structure of the first common electrode CE1 and the circuit connection structure of the second common electrode CE2 can be reduced.

Figure 9A:
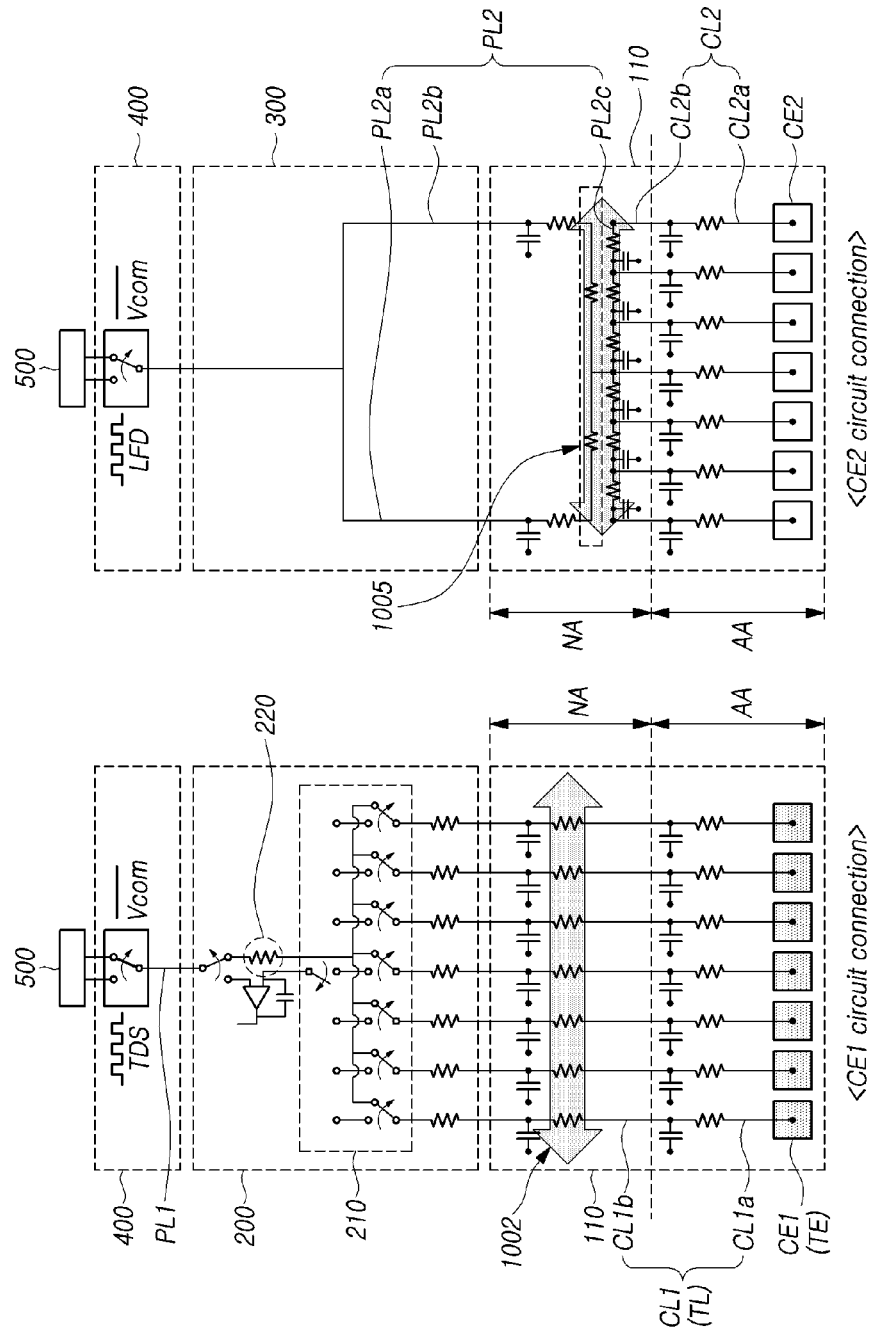
FIGS. 9A and 9B are diagrams illustrating other example of a circuit connection structure of a first common electrode and a circuit connection structure of a second common electrode included in a touch display device according to aspects of the present disclosure and a resistance distribution according to the example.
Figure 9B:
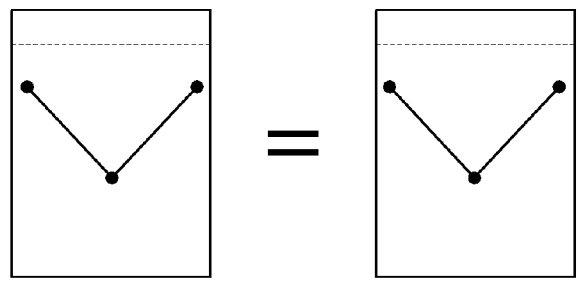

FIGS. 9A and 9B are diagrams illustrating other example of the circuit connection structure of the first common electrode CE1 and the circuit connection structure of the second common electrode CE2 included in the touch display device 100 according to aspects of the present disclosure and the resistance distribution according to the example.

Referring to FIG. 9A, in the circuit connection structure of the first common electrode CE1, the compensation resistance 220 can be disposed in the touch driving circuit 200. And a resistance of the output end of the multiplexer 210 disposed in the touch driving circuit 200 can be constant or similar.

In the circuit connection structure of the second common electrode CE2, the second power supply line PL2 can be connected first to the second common electrode line CL2 located on the center portion among the plurality of second common electrode lines PL2.

For example, the common electrode line connection portion PL2c of the second power supply line PL2 can be extended from the first part PL2a and the second part PL2b toward the center portion. The common electrode line connection portion PL2c can be connected first to the second common electrode line CL2 located on the center portion, and can be extended toward the side portion. The common electrode line connection portion PL2c can be extended toward the side portion to connected to the second common electrode line CL2 sequentially.

Thus, the resistance distribution that an area indicated by 1005 in FIG. 9A represents can represent a distribution that a resistance increases from the center portion toward the side portion.

By the resistance distribution that the area indicated by 1005 represents, the resistance distribution that the second common electrode line CL2 connected to the second common electrode CE2 represents, such as an example illustrated in FIG. 9B, can represent a distribution increasing toward the side portion.

The resistance distribution of the circuit connection structure of the second common electrode CE2 can become similar with the resistance distribution of the circuit connection structure of the first common electrode CE1.

Figure 10:
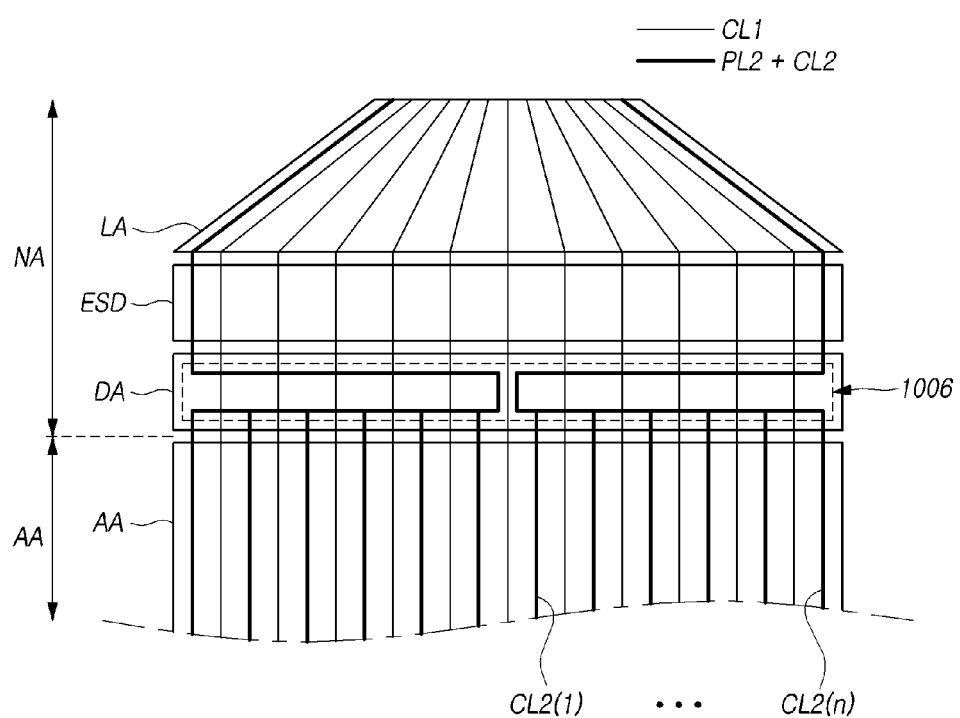
FIG. 10 is a diagram illustrating an implementation example of the circuit connection structure illustrated in FIG. 9A.

FIG. 10 is a diagram illustrating an implementation example of the circuit connection structure illustrated in FIG. 9A.

Referring to FIG. 10, the first common electrode line CL1 can be electrically connected to the touch driving circuit 200, and can be extended to the active area AA by passing on a link area LA, an electrostatic discharge area ESD, and a dummy area DA.

The link area LA can be an area where at least a portion of the first common electrode link line CL1b is disposed. The link area LA can be an area where a portion of the second power supply line PL2 is disposed. In some cases, a portion of the second common electrode link line CL2b can be disposed on the link area LA.

The electrostatic discharge area ESD can be an area where a pattern or a line for discharging an electrostatic flowed to the display panel 110 is disposed.

The dummy area DA can be an area where a dummy pixel not driving a display is disposed.

The first common electrode line CL1 can electrically connect between the first common electrode CE1 and the touch driving circuit 200, and can supply the touch driving signal TDS or the common voltage Vcom to the first common electrode CE1.

The second common electrode line CL2 can be disposed on the active area AA and the non-active area NA. The second common electrode line CL2 can be electrically connected to the second power supply line PL2 on the non-active area NA.

The second power supply line PL2 can be disposed along a side portion on the link area LA and the electrostatic discharge area ESD. The second power supply line PL2 can be extended from some area of the non-active area NA toward a center portion.

For example, the second power supply line PL2 can be extended toward the center portion on the dummy area DA, and can be extended from the center portion toward the side portion again. The second power supply line PL2, such as an example illustrated in FIG. 10, can be a separated structure on the center portion of the dummy area DA. Alternatively, the second power supply line PL2 can be extended from both side portions of the dummy area DA toward the center portion and can be a connected structure on the center portion of the dummy area DA. A structure of the second power supply line PL2 can be various structures being capable that a resistance of the second common electrode line CL2 located on the side portion is greater than a resistance of the second common electrode line CL2 located on the center portion.

Thus, such as represented in an area indicated by 1006, at least a portion of the second power supply line PL2 can cross the first common electrode line CL1 at two or more points. And at least a portion of the second power supply line PL2 can be disposed on a different layer from the first common electrode line CL1.

Thus, the common electrode line connection portion PL2c of the second power supply line PL2 disposed in a direction crossing the first common electrode line CL1 can be disposed on a layer different from a layer where the first common electrode line CL1 is disposed, and can cross the first common electrode line CL1 at two or more points.

The second power supply line PL2 can be extended toward the center portion and can be extended toward the side portion again, and can be connected to the second common electrode line CL2 sequentially. Thus, a resistance of CL2($n$) which is the second common electrode line CL2 located on the side portion can be greater than a resistance of CL2(1) which is located on the center portion.

The resistance distribution of the circuit connection structure of the second common electrode CE2 can become similar with the resistance distribution of the circuit connection structure of the first common electrode CE1 by the connection structure of the second power supply line PL2 and the second common electrode line CL2.

And as a portion that the second power supply line PL2 is extended toward the center portion and extended toward the side portion again is disposed on the dummy area DA, the resistance distribution of the circuit connection structure of the second common electrode CE2 can be adjusted without affecting other lines or patterns disposed on the non-active area NA.

Furthermore, examples described above present cases of adjusting the resistance distribution of the circuit connection structure of the first common electrode CE1, or adjusting the resistance distribution of the circuit connection structure of the second common electrode CE2, but in some cases, by adjusting both the resistance distribution of the circuit connection structure of the first common electrode CE1 and the resistance distribution of the circuit connection structure of the second common electrode CE2, the deviation of the resistance distribution can be reduced.

According to aspects of the present disclosure, as driving some of the plurality of common electrode CE embedded in the display panel 110 as the touch electrode TE, the function of the touch sensing can be provided while minimizing an increase of lines, pads or the like, without disposing separate electrodes.

Furthermore, as disposing the compensation resistance 220 inside the touch driving circuit 200, the resistance deviation between the first common electrode CE1 driven as the touch electrode TE and the second common electrode not driven as the touch electrode TE can be reduced.

Furthermore, as adjusting a resistance of the output end of the multiplexer 210 in the touch driving circuit 200, or adjusting a resistance of a path that a power is supplied to the second common electrodes CE2 which are electrically connected, the resistance distribution according to locations of the first common electrode CE1 and the second common electrode CE2 can be adjusted similarly.

Thus, as making the total resistance and the resistance distribution according to locations between the first common electrode CE1 and the second common electrode CE2 similar, an abnormality of the display driving of the touch display device 100 performing the touch sensing by driving only some of the common electrodes CE as the touch electrode TE can be prevented.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
a plurality of first electrodes and a plurality of second electrodes disposed to be separated from one another on an active area of a display panel;
a plurality of first lines electrically connected between each of the plurality of first electrodes and a touch driving circuit;
a plurality of second lines electrically connected to at least one of the plurality of second electrodes, and at least some of the plurality of second lines are electrically connected to each other on a non-active area of the display panel,
wherein the touch driving circuit includes at least one multiplexer electrically connected to the plurality of first lines,
wherein a resistance of the plurality of first lines disposed in a center portion of the touch driving circuit and the at least one multiplexer is greater than a resistance of the plurality of first lines disposed on both sides of the center portion of the touch driving circuit and the at least one multiplexer.

2. The touch display device of claim 1, further comprising:
a first power supply line electrically connected between the touch driving circuit and a touch power circuit; and
a second power supply line electrically connected between the plurality of second lines and the touch power circuit, and disposed to bypass the touch driving circuit.

3. The touch display device of claim 2, further comprising:
a compensation resistance disposed in the touch driving circuit, and electrically connected between the at least one multiplexer and the first power supply line.

4. The touch display device of claim 2, wherein the second power supply line comprises a line connection portion disposed on the non-active area of the display panel, disposed in a direction crossing the plurality of second lines, and connected to at least one of the plurality of second lines.

5. The touch display device of claim 4, wherein the line connection portion is located on a dummy area disposed on the non-active area of the display panel.

6. The touch display device of claim 2, wherein the second power supply line comprises a first part disposed on a first side of the touch driving circuit and a second part disposed on a second side of the touch driving circuit, and
wherein the touch driving circuit is located between a point that the first part and the second part are diverged and the active area of the display panel.

7. The touch display device of claim 2, wherein at least a portion of the second power supply line is located on a layer different from a layer where the first line is disposed on the non-active area of the display panel.

8. The touch display device of claim 1, wherein at least a portion of the plurality of first lines is located on a layer different from a layer where the plurality of second lines are disposed.

9. The touch display device of claim 1, wherein the plurality of first electrodes and the plurality of second electrodes are disposed alternatively.

10. The touch display device of claim 1, wherein a common voltage of a same level is supplied to the plurality of first electrodes and the plurality of second electrodes in a first period,
- a touch driving signal is supplied to the plurality of first electrodes in a second period, and
- a signal corresponding to the touch driving signal is supplied to the second electrodes in the second period.

11. The touch display device of claim 10, wherein the touch driving signal is supplied sequentially, and the signal corresponding to the touch driving signal is supplied simultaneously.

12. A touch display device, comprising:
- a plurality of first electrodes and a plurality of second electrodes disposed to be separated from each other on an active area of a display panel;
- a plurality of first lines electrically connected between each of the plurality of first electrodes and a touch driving circuit;
- a first power supply line electrically connected between the touch driving circuit and a touch power circuit;
- a plurality of second lines electrically connected to at least one of the plurality of second electrodes; and
- a second power supply line electrically connected between the plurality of second lines and the touch power circuit, and
- wherein the second power supply line comprising:
- a first part disposed on a first side of the touch driving circuit;
- a second part disposed on a second side of the touch driving circuit; and
- a line connection portion disposed on a non-active area of the display panel, connecting between the first part and the second part and the plurality of second lines, and crossing at least one of the plurality of first lines at two or more points on the non-active area.

13. The touch display device of claim 12, wherein the touch driving circuit comprises at least one multiplexer electrically connected to the plurality of first lines, and wherein a resistance of a line connecting the first line disposed on a first area corresponding to a center portion of the touch driving circuit and the multiplexer is substantially same as a resistance of a line connecting the first line disposed on a second area located on both sides of the first area and the multiplexer.

14. The touch display device of claim 13, further comprising:
- a compensation resistance disposed in the touch driving circuit, and electrically connected between the multiplexer and the first power supply line.

15. The touch display device of claim 12, wherein, in the line connection portion, a length of a section connecting between the first part or the second part and the second line disposed on the second area is greater than a length of a section connecting between the first part or the second part and the second line disposed on the first area.

16. A touch display device, comprising:
- a plurality of first electrodes and a plurality of second electrodes disposed to be separated from each other on an active area of a display panel;
- a plurality of first lines electrically connected to each of the plurality of first electrodes, and insulated from each other;
- a plurality of second lines electrically connected to at least one of the plurality of second electrodes, and at least some of the plurality of second lines are electrically connected to each other on a non-active area of the display panel,
- wherein the plurality of first lines and the plurality of second lines are supplied with a common voltage output from a touch power circuit, and
- a compensation resistance located on a path that the plurality of first lines supplied with the common voltage output from the touch power circuit.

17. The touch display device of claim 16, wherein each of the plurality of first electrodes is physically separated from other first electrode, and electrically separated from other first electrode.

18. The touch display device of claim 16, wherein each of the plurality of second electrodes is physically separated from other second electrode, and electrically connected to at least one of the plurality of second electrodes.

* * * * *